United States Patent
Kasai et al.

(10) Patent No.: US 7,204,286 B2
(45) Date of Patent: Apr. 17, 2007

(54) APPARATUS FOR CONTINUOUSLY FORMING FRP SQUARE PIPE

(75) Inventors: Toru Kasai, Tokyo (JP); Makoto Okamoto, Tokyo (JP); Shuntaro Kuriyama, Tokyo (JP)

(73) Assignee: Jamco Corporation, Tokyo (JP)

( * ) Notice: Subject to any disclaimer, the term of this patent is extended or adjusted under 35 U.S.C. 154(b) by 487 days.

(21) Appl. No.: 10/734,203

(22) Filed: Dec. 15, 2003

(65) Prior Publication Data

US 2005/0126714 A1   Jun. 16, 2005

(51) Int. Cl.
*B65H 81/00* (2006.01)
(52) U.S. Cl. .................... 156/425; 156/433; 156/441; 156/459
(58) Field of Classification Search ............. 156/425, 156/441, 433, 459, 173, 175
See application file for complete search history.

(56) References Cited

U.S. PATENT DOCUMENTS

| | | | | |
|---|---|---|---|---|
| RE27,355 E | * | 5/1972 | Skoggard et al. ........... | 156/432 |
| 3,676,258 A | * | 7/1972 | Jackson ...................... | 156/392 |
| 4,125,423 A | * | 11/1978 | Goldsworthy ............... | 156/428 |
| 6,601,627 B2 | * | 8/2003 | Kasai et al. ................ | 156/441 |

FOREIGN PATENT DOCUMENTS

| EP | 1 157 811 A2 | 11/2001 |
|---|---|---|
| JP | JO-51-131573 A * | 11/1976 |
| JP | 11-156988 | 6/1999 |
| JP | 2001-328130 | 11/2001 |
| JP | 3357342 | 10/2002 |

OTHER PUBLICATIONS

European Search Report dated May 24, 2004.
Notice of Reason(s) for Refusal from the Japanese Patent Office dated Aug. 27, 2004 in co-pending application No. 2002-272614 and translation.

* cited by examiner

*Primary Examiner*—Jeff H. Aftergut
(74) *Attorney, Agent, or Firm*—Westerman, Hattori, Daniels & Adrian, LLP.

(57) ABSTRACT

An apparatus 1 for continuously forming an FRP square pipe comprises a long core 10 for laminating prepreg sheets, and to this core 10 are fed prepreg sheets from prepreg laminating devices 20, 30, 40 and 50 with a release film interposed between the core, so as to be laminated into square pipe form. The core 10 has an outer diameter size smaller than the inner diameter size of the square pipe to be formed. The outer circumference of the square pipe is wrapped with a tape-like film fed from a tape-like release film wrapping device 200 in spiral fashion, and the work is heated and pressed in a hot press 100. The work is then subjected to additional heating in a postcure furnace 110 to form the FRP square pipe. The square pipe is intermittently pulled by a puller 130 disposed downstream of a clamp 120. The pipe is then cut to predetermined lengths by a cutter not shown to be completed as a product.

2 Claims, 8 Drawing Sheets

APPARATUS FOR CONTINUOUSLY FORMING FRP SQUARE PIPE

FIELD OF THE INVENTION

The present invention relates to an apparatus for continuously forming a square pipe made of fiber reinforced plastics (FRP) having high strength and light weight, suitable for application to aircrafts and building members.

DESCRIPTION OF THE RELATED ART

One conventional method for forming an FRP square pipe is so-called a pultrusion method according to which a fiber material is impregnated with resin and introduced into a heated mold to be cured therein. According to this method, however, the fiber content is restricted, and the fiber orientation tends to be deteriorated, so it is difficult to manufacture a product with high quality. On the other hand, pipe members formed using prepreg material (fiber impregnated with resin and semi-cured) have higher fiber content and the contained fibers maintain uniform orientation angle, so such pipes are used for fabricating high-strength components such as aircraft components.

The prior art method for manufacturing an FRP square pipe using prepreg involves providing a releasing treatment to a metal square rod functioning as a core, disposing predetermined layers of prepreg to form a multilayered structure, and molding the same using an autoclave. Especially when the product being molded is long, a large facility including the autoclave and a drawing device for drawing out the metal square rod after curing the member is required.

Another prior art method comprises using a silicon rubber tube or the like as core material, laminating-layers of prepregs thereon, setting the same on an outer die, and providing inner pressure using air so as to mold the pipe. This method requires less pulling force but requires an outer die, and the formed silicon rubber tube has durability problems.

The present applicant proposed in Patent Document 1 an apparatus for continuously forming an FRP square pipe, but a phenomenon was confirmed according to the apparatus in which the resin material and fiber ran off to left and right sides of the pipe with respect to the direction of travel due to the mechanism of the hot press, which resulted in the partial variation of thickness of the produced pipe.

Patent Document 1: Japanese Patent Laid-Open Publication No. 2001-328130 (Japanese Patent No. 3357342)

SUMMARY OF THE INVENTION

Therefore, the present invention provides an apparatus for forming a high-quality square pipe to be applied to aircrafts or the like, having a uniform thickness and that can be formed in a continuous manner using a prepreg material. The present apparatus requires less auxiliary facilities.

The apparatus for continuously forming an FRP square pipe according to the present invention comprises a device for sequentially laminating a release film slit to have a predetermined width and prepreg sheets onto an aluminum core having an outer diameter that is smaller than the inner diameter of a square pipe or molded product and that is fixed and supported at one side, a device for wrapping a heat-resistant heat-shrinkable film around the prepreg in the circumferential direction that is disposed before a mold, a member having a tapered portion with a diameter size that becomes equal to the inner diameter of the molded product before a hot press, a hot press for providing heat and pressure to the prepreg, an oven for providing additional heating to the prepreg, and a device for pulling and fixing the molded product together with the inner film thereof, wherein each device is interlocked with the other devices and controlled so that the molded product is moved for a predetermined amount of distance after the product is subjected to heat and pressure for a predetermined amount of time.

DETAILED DESCRIPTION OF THE PREFERRED EMBODIMENT

Figures 1A, 1B:
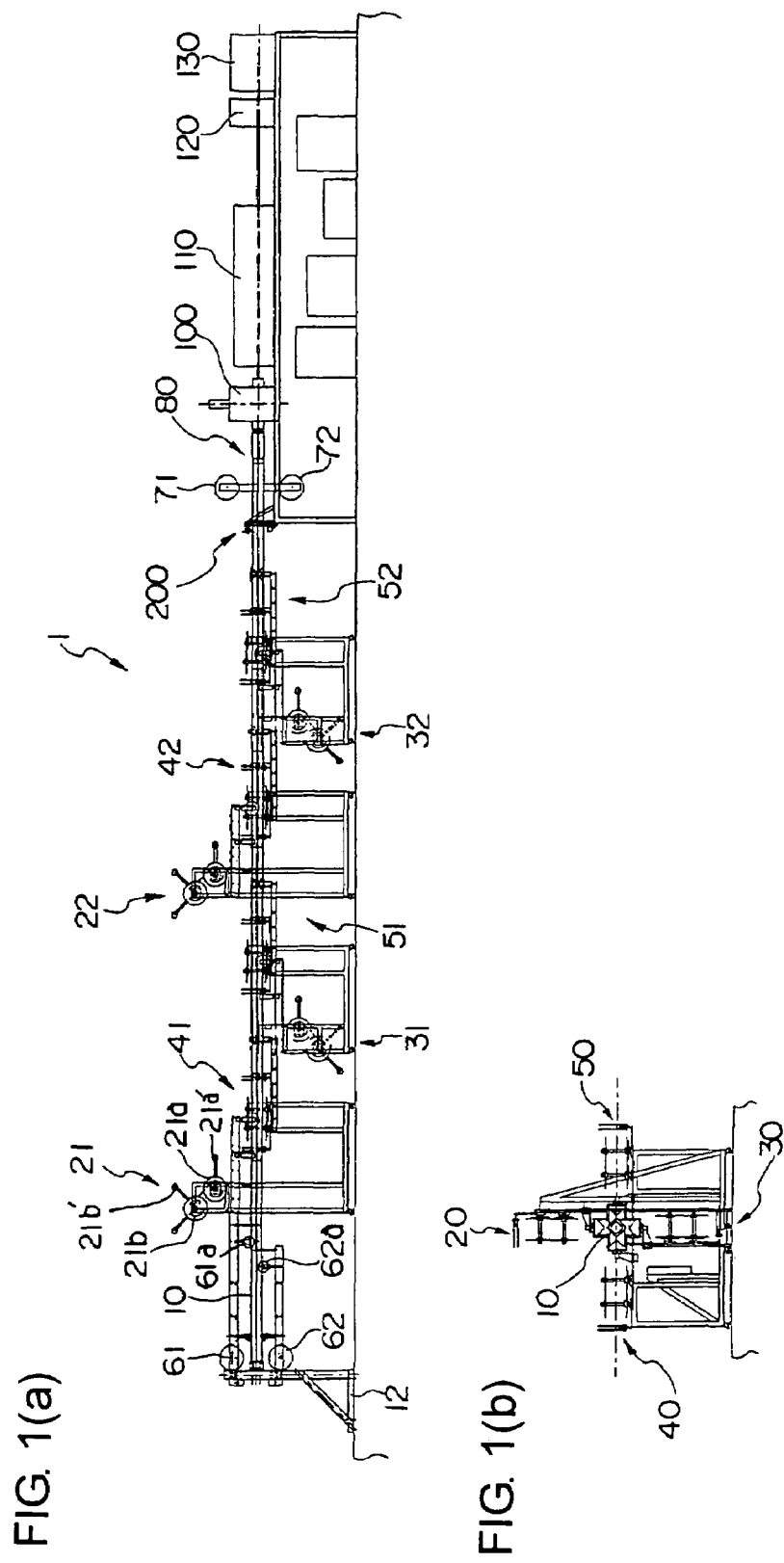
FIG. 1 is an explanatory view showing the structure of an apparatus for continuously forming an FRP square pipe according to the present invention.

FIG. 1 is an explanatory view showing the structure of the apparatus for continuously forming an FRP square pipe according to the present invention.

The apparatus for continuously forming an FRP square pipe denoted as a whole by reference number 1 is equipped with a long core 10 having an outer diameter smaller than the inner diameter of the square pipe to be produced. This core 10 is for laminating layers of prepreg sheets on the outside thereof, so the length of the core is long enough to have the layers of prepreg sheets laminated thereon.

Therefore, the core must be as long as approximately 10 meters, so in order to reduce weight, the core is made of a light metal such as aluminum, and the end portion of the core is supported by a stand.

Prepreg sheet laminating devices 20, 30, 40 and 50 are disposed so as to surround this core 10, each device disposed 90 degrees apart from the adjacent devices.

Figure 2:
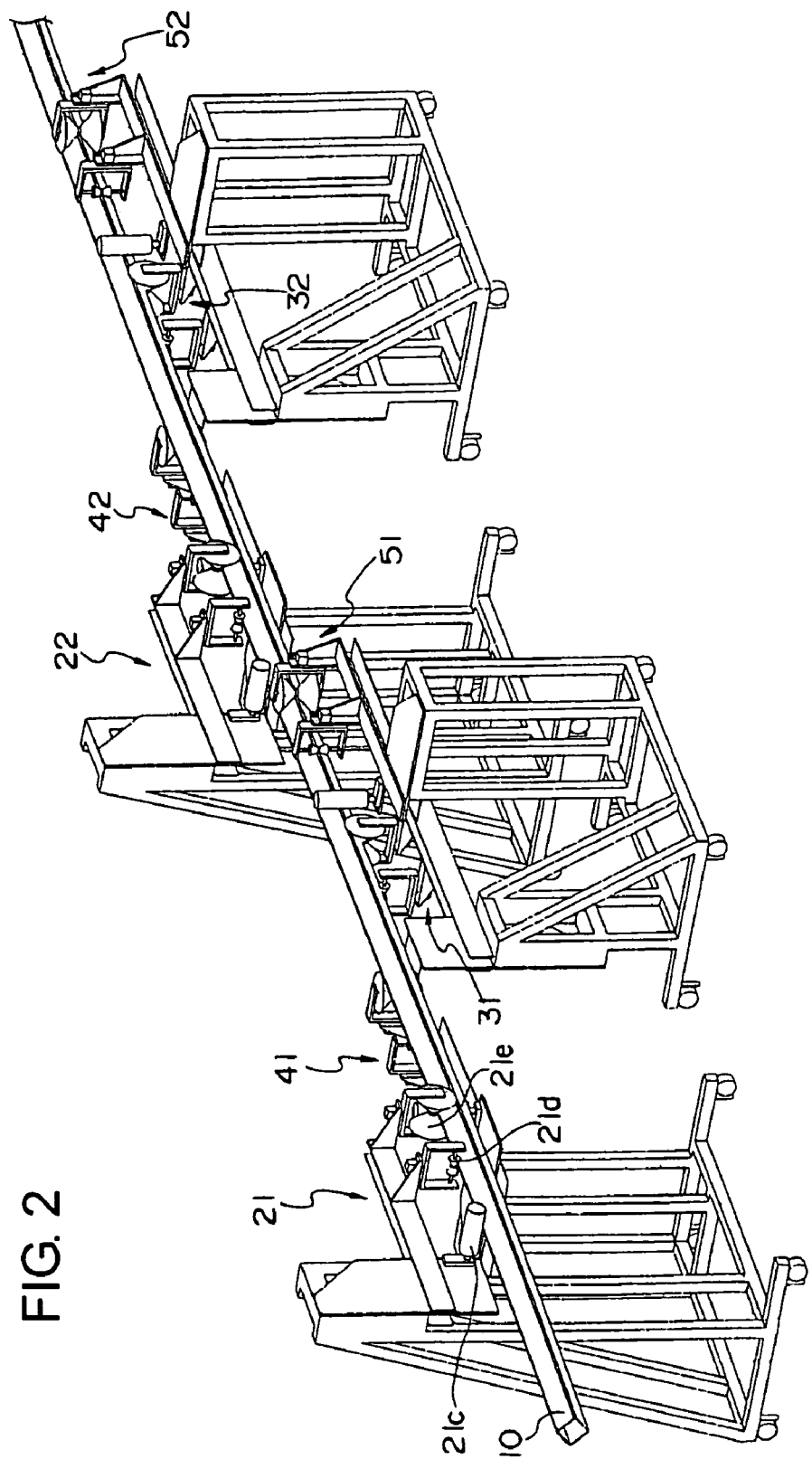
FIG. 2 is a perspective view showing the laminating device for prepreg sheets.
Figure 3:
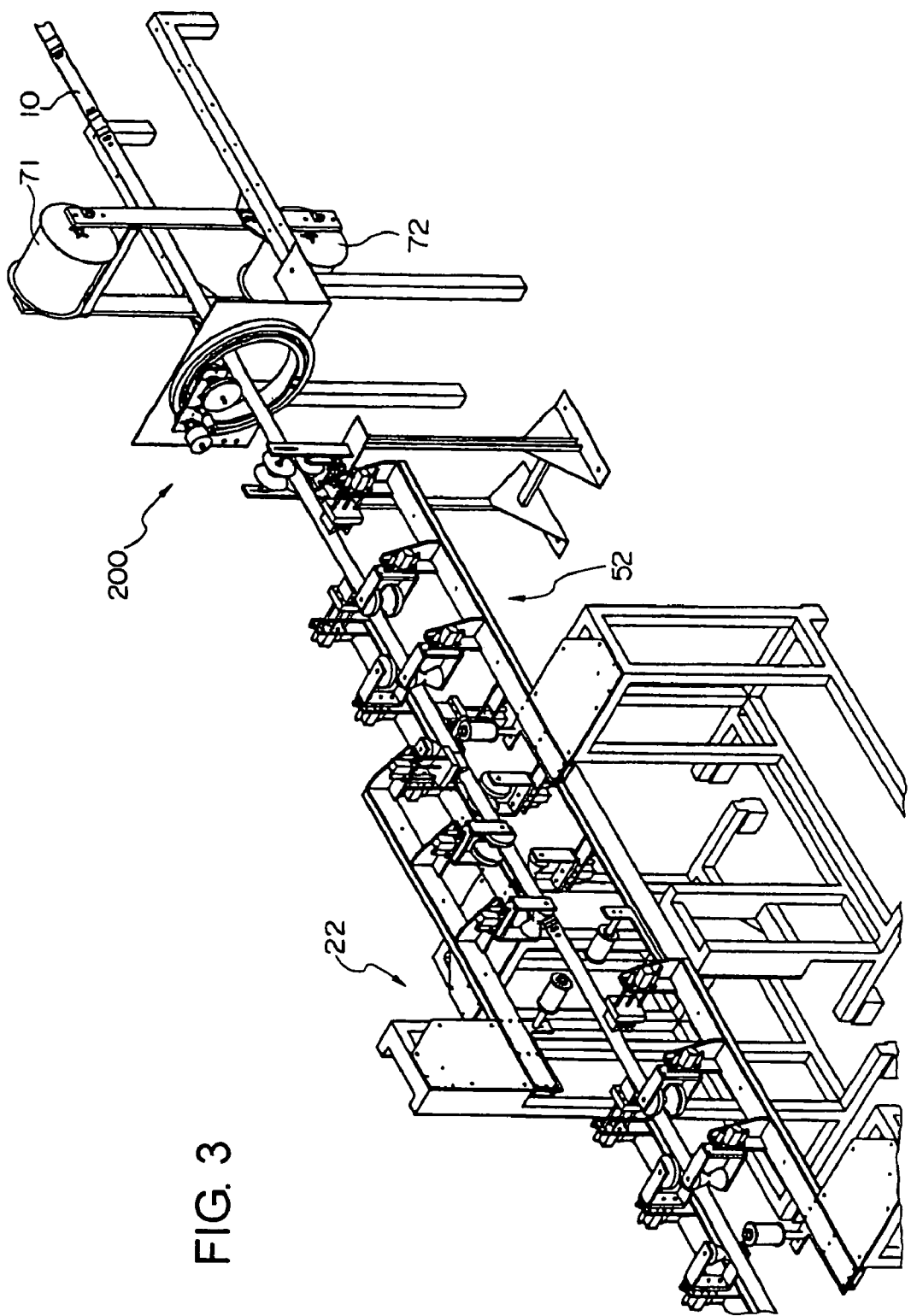
FIG. 3 is a perspective view showing the wrapping device for the tape-like release film.

FIG. 2 is a perspective view showing the arrangement of the prepreg sheet laminating devices, and FIG. 3 is a perspective view of the winding device for winding the tape release film.

The prepreg laminating devices 20 and 30 are disposed above and below the core 10, the core having its diagonal corners disposed perpendicularly. The prepreg laminating devices 40 and 50 are disposed horizontally, centering around the core 10.

The prepreg laminating device 20 positioned above the core 10 has plural stations 21, 22.

All the stations have the same arrangement. The first station 21 comprises two feeding reels 21*a* for feeding the prepreg sheets. Each feeding reel is equipped with a film take-up roll 21*a*' or 21*b*' for reeling in the film from the surface of the tacky (adhesive) prepreg sheet. The prepreg sheet being fed has a width that corresponds to two sides out of the four sides of the square rod-shaped core.

The prepreg sheet being reeled out is guided by a column-shaped first roller 21c to the area above the upper corner of the core 10 with its center corresponding to the center of the core, and by a second roll 21d, the center of the prepreg sheet is pressed onto the corner of the core. A third roll 21e laminates the whole prepreg sheet onto the surface of the core 10.

Prior to laminating the prepreg sheet onto the surface of the core 10, a film so-called a release film is fed to the surface of the core 10 for releasing the formed FRP square pipe from the core 10. The release films being fed from supply reels 61 and 62 disposed on the stand 12 for the core 10 are disposed on the surface of the core 10 via guide rolls 61a and 62a.

According to the embodiment shown in FIG. 1, two sets of prepreg sheet laminating devices 21, 22 are disposed above the core 10 and two sets of prepreg sheet laminating devices 31, 32 are disposed below the core 10.

Similarly, two sets of prepreg sheet laminating devices 41, 42 and 51, 52 are disposed on left and right sides of the core 10.

As explained, the cross-sectional structure of the FRP square pipe has eight layers of prepreg sheets laminated on each of the sides of the square.

This square pipe is sent intermittently toward the hot press device by a feeder described later.

A release film wrapping device 200 wraps a tape-like release film on the outer circumference of the square pipe in a spiral fashion. Since the square pipe is sent intermittently by a puller described later, the release film wrapping device 200 circles intermittently around the pipe, moving 90 degrees at a time, thereby wrapping the tape-like release film onto the outer circumference of the square pipe.

By the prepreg sheet laminating device, a release film is laminated on the outer side of the multiple layer of prepreg sheets formed into a square-pipe shape. The release films fed from the feeding reels 71 and 72 are overlapped on the surface of the prepreg sheets via guide rolls.

The prepreg sheets laminated to form a square pipe is sent toward the hot press 100, but prior to being subjected to hot pressing, the sheets pass through a tapered portion so that the size of the inner diameter of the sheets is enlarged to correspond to that of the molded square pipe.

Figure 4:
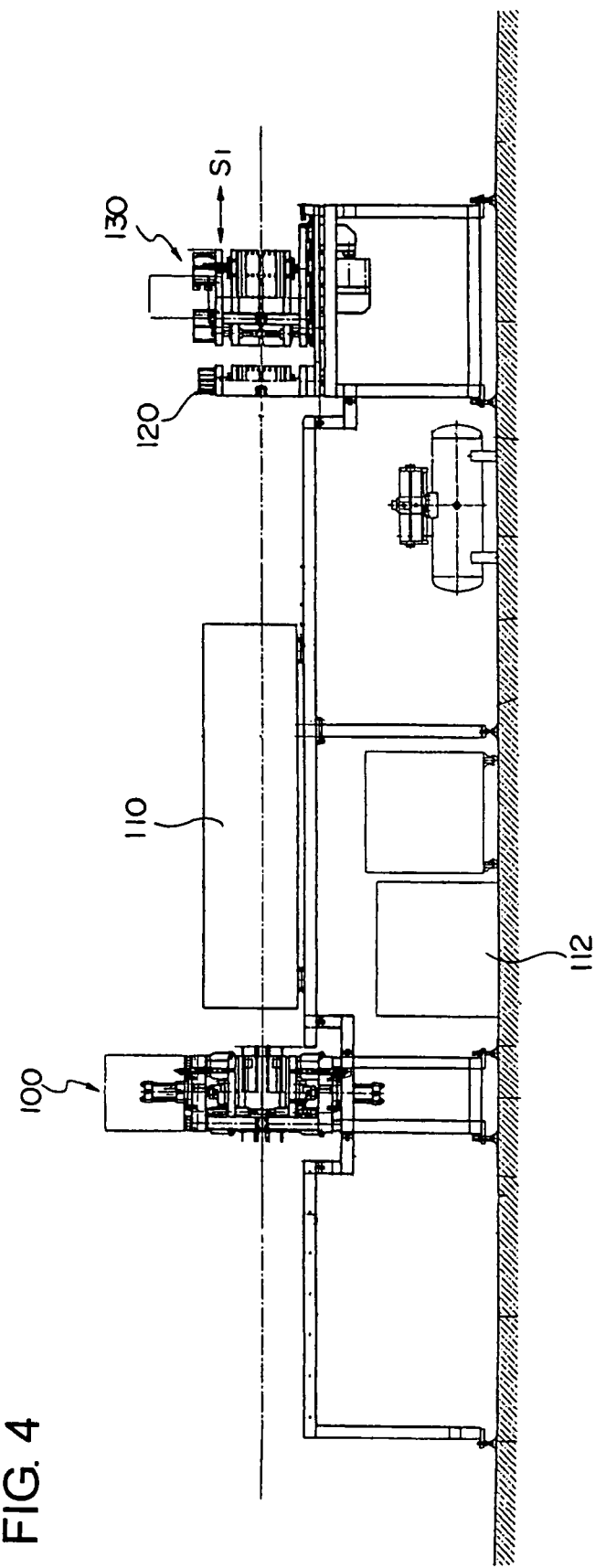
FIG. 4 is an explanatory view showing the layout of the hot press, the postcure furnace, the clamp device and the puller.

FIG. 4 is an explanatory view showing the layout of the hot press 100, a postcure furnace 110 which is a furnace for providing additional heating, a work clamp 120 and a puller 130.

The hot press 100 provides heat and pressure for a predetermined period of time to the square pipe-shaped laminated prepreg sheet material in a mold heated from the outside, to thereby promote the curing of the thermosetting resin impregnated in the prepreg sheet material.

The hot press core 10 passes through the mold of the hot press 100 and protrudes from the exit side of the hot press.

The temperature and amount of time of the heating are selected appropriately according to the properties of the prepreg sheet material.

The molded square pipe having been subjected to hot pressing is then sent to the postcure furnace 110. The postcure furnace 110 heats the square pipe passing through the furnace at a predetermined temperature for a predetermined amount of time so as to completely cure the thermosetting resin contained in the prepreg sheet.

The clamp device 120 disposed downstream of the postcure furnace 110 grips and fixes the molded square pipe being sent in connected form. The prepreg sheet material being fed to the core 10 for laminating the prepreg sheets is given tension that pulls the prepreg sheets back toward the feeding reel. Accordingly, there is a force continuously acting on the laminated prepreg sheets pulling the sheets back toward the feeding reel. The clamp device 120 counters this force and holds the molded square pipe.

The puller 130 comprises an arrangement that grips the molded square pipe and reciprocates in the direction shown by the arrows. Hydraulic pressure is used as power source for the reciprocation.

Figure 5:
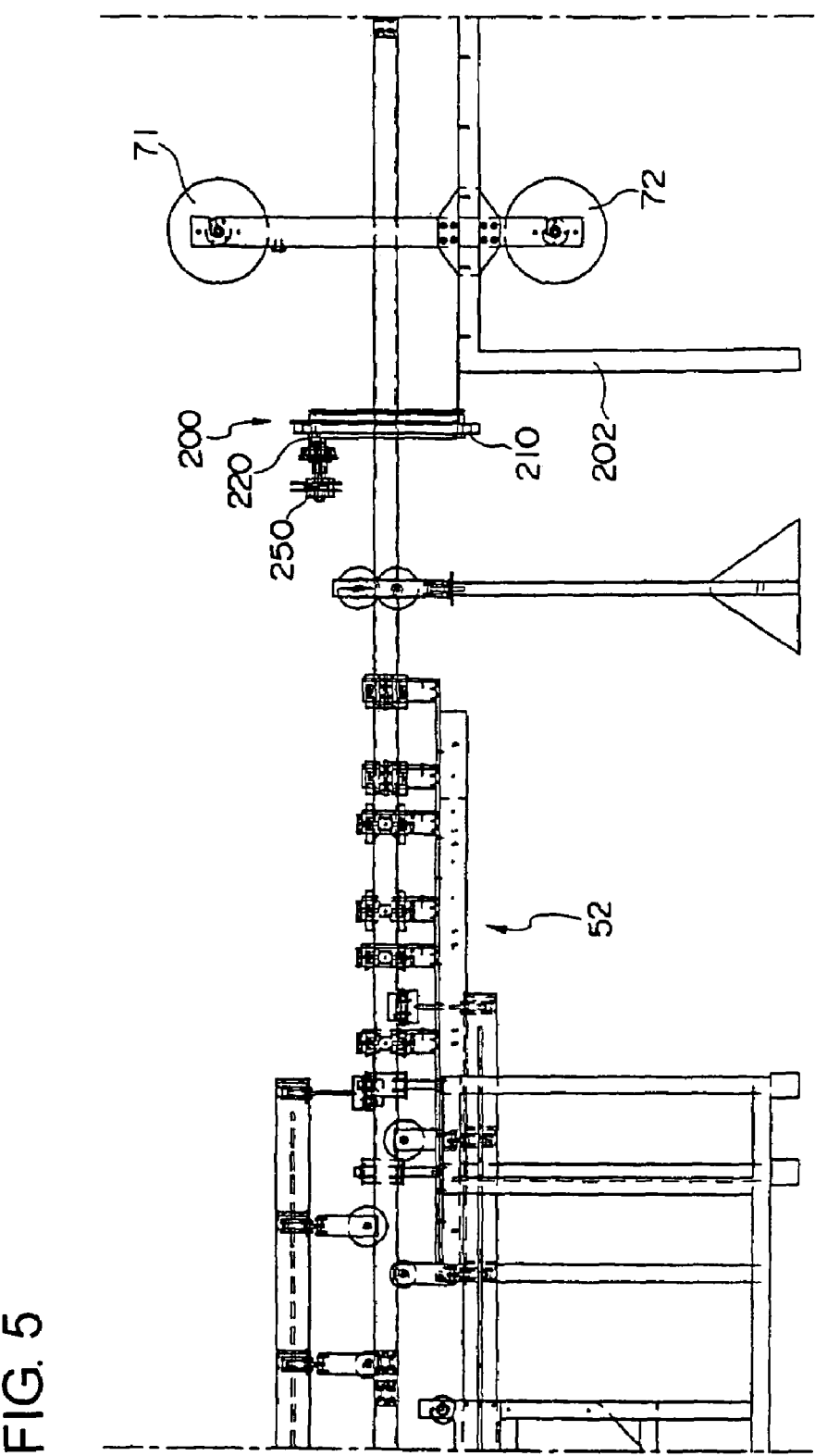
FIG. 5 is a side view showing the wrapping device for laminating the tape-like release film.
Figure 6:
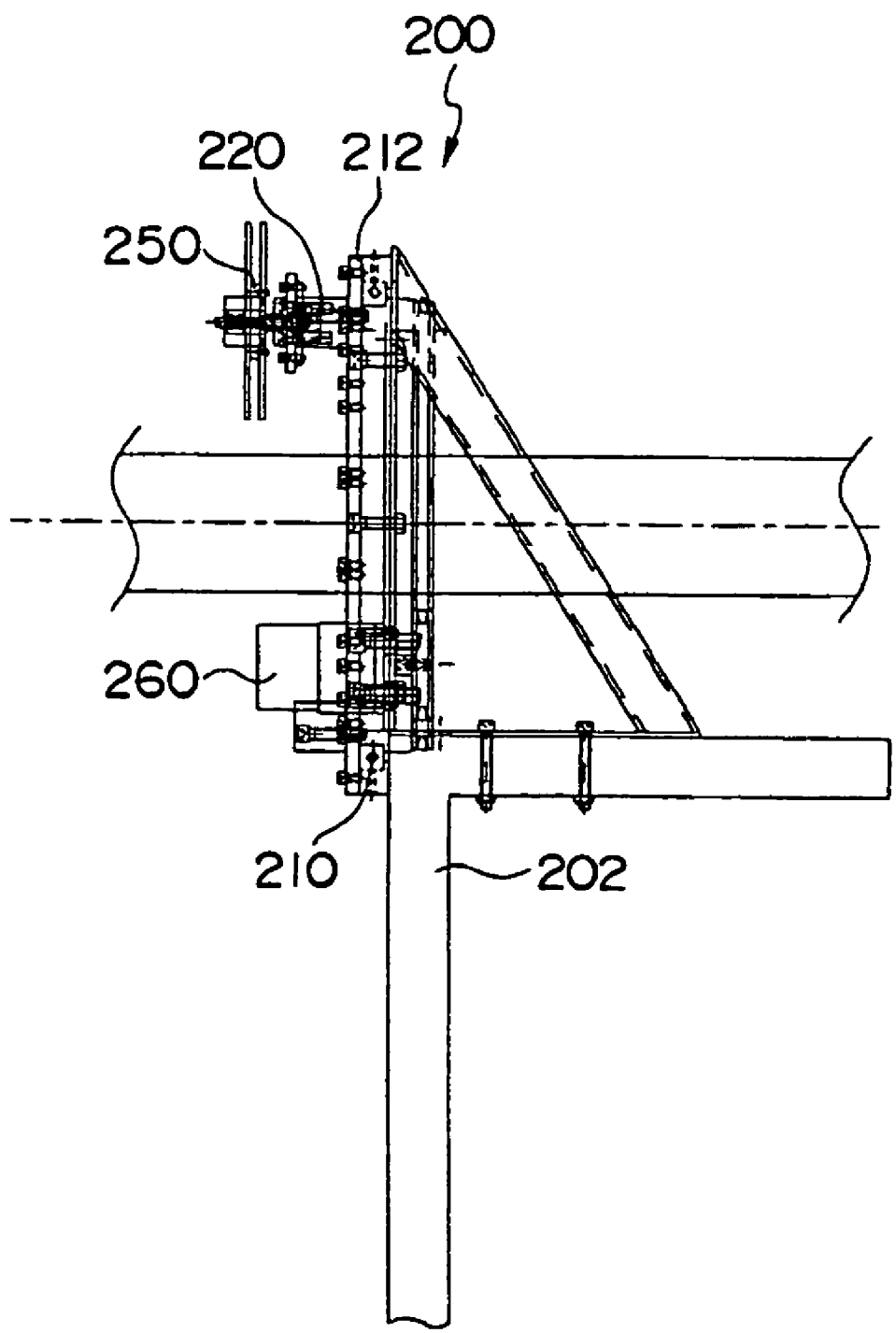
FIG. 6 is a side view showing the wrapping device for laminating the tape-like release film.
Figure 7:
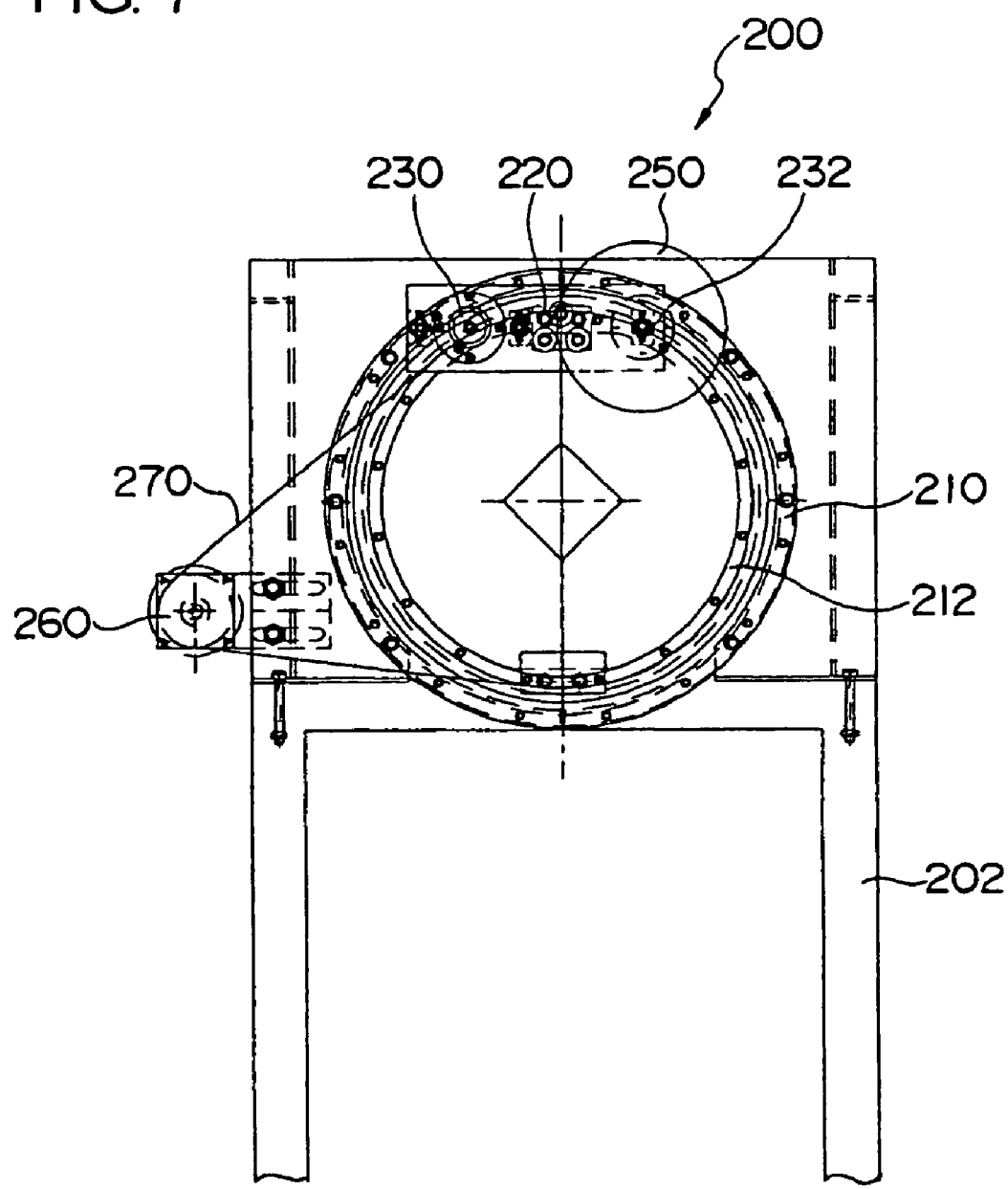
FIG. 7 is a front view of the wrapping device for laminating the tape-like release film.

FIG. 5 is a side view of the release film wrapping device 200, FIG. 6 is an enlarged side view showing the main portion thereof, and FIG. 7 is a front view thereof.

The release film wrapping device 200 comprises a base 202 and a ring-like guide rail 210 disposed on the base.

A rotary ring 212 is disposed on the inner circumference of the ring-like guide rail 210 in such a manner that the ring 212 is capable of moving in circling motion on the rail. A drive belt 270 is wound around the rotary ring 212, and the belt 270 is driven by a motor 260.

A block 220 is mounted on the rotary ring 212, and to this block 220 is fixed a reel 250 for feeding the tape-like release film.

The reel 250 functions to provide tension to the tape-like release film being fed.

Figure 8:
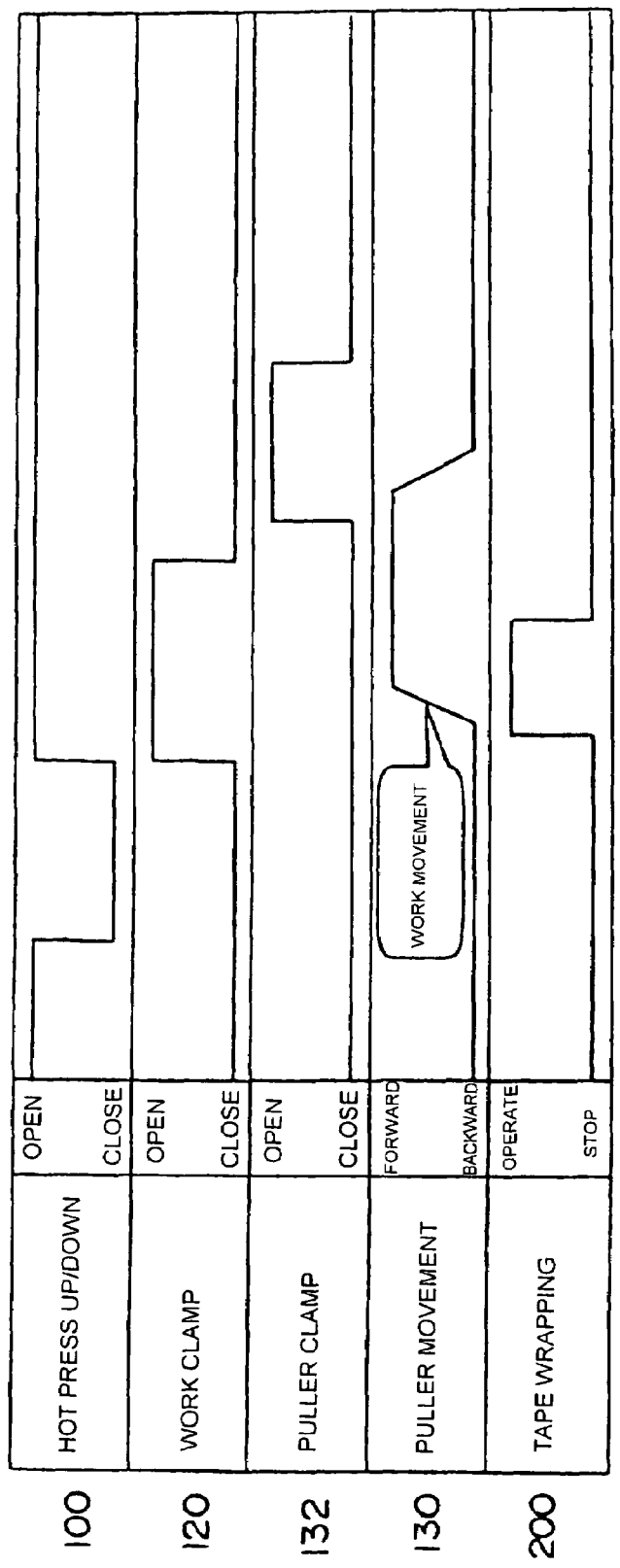
FIG. 8 is a chart showing the timing of operation of devices.

FIG. 8 is a sequence chart showing the timing of operation of the present devices.

While the mold of the hot press 100 is closed to provide heat and pressure to the prepreg sheet material, a pre-tension device not shown provides pre-tension to the prepreg sheet so that it is expanded to correspond to the predetermined square pipe size.

While the hot press 100 is operating, the work clamp 120 grips and holds the work. During this time, the clamp of the puller 130 is opened.

When a single hot press step is completed, the mold of the hot press is released, the work clamp 120 is opened, and the puller 130 operates and pulls out the work for a predetermined length from the hot press. A puller core not shown follows this movement.

During the movement of the work, the rotary ring 212 of the tape wrapping device 200 circles for 90 degrees, for example, so as to wrap the tape-like release film in a spiral manner on the outer circumference of the work.

By wrapping the release film around the circumference of the FRP square pipe or work, the occurrence of a flash caused by the resin oozing out of the prepreg sheet during hot pressing can be suppressed.

In order to achieve this aim, tension must be provided to the tape-like release film while it is being wrapped around the outer surface of the square pipe.

Therefore, the reel for feeding the tape-like release film is equipped with a function to control the tension being added to the film.

Furthermore, the release film can be a stretch film having resistance to heat equal to or higher than the curing temperature of the prepreg being used and generates thermal contraction stress.

The above-described processes are repeated to continuously form the FRP square pipe.

The continuously formed FRP square pipe is cut into predetermined lengths by a cutter not shown so as to acquire the product.

As explained, the present invention enables an FRP square pipe to be formed continuously by laminating prepreg sheets on a core in square-pipe form, hot-pressing the prepreg, and subjecting the prepreg to a postcure process.

Since the step for laminating the prepreg sheets are automated, the present invention enables a high-quality FRP square pipe to be manufactured efficiently.

What is claimed is:

1. An apparatus for continuously forming a fiber reinforced plastic square pipe by molding a semi-cured prepreg material formed by impregnating a thermosetting resin in carbon fiber or glass fiber, the apparatus comprising:
   a square rod-shaped core having an outer diameter that is smaller than an inner diameter of the square pipe to be formed and a tapered portion with a diameter size that becomes equal to the inner diameter of the molded product before a hot press, the core supported and fixed at one end thereof;
   a device for placing a release film on the surface of the core;
   a device for laminating a predetermined number of prepreg sheets sequentially on the release film;
   a device for wrapping a tape-like release film in a circumferential direction after the predetermined number of prepreg sheets are laminated;
   a device for placing the release film on an outer layer of a laminated prepreg sheets;
   a device for hot pressing for providing heat and pressure to the prepreg sheets;
   a heating furnace for providing additional heating to a hot-pressed prepreg sheets;
   a device for discontinuously pulling a formed prepreg square pipe; and
   a device for holding a square pipe at hot press;
   wherein the device for wrapping the tape-like release film comprises:
   a ring-like guide rail disposed on a base;
   a rotary ring disposed on a ring-like inner circumference of the guide rail in such a manner that the ring is capable of moving in circling motion;
   a driving device of the rotary ring;
   a block mounted on the rotary ring; and
   a reel fixed to the block for feeding the tape-like release film;
   which reel controls tension placed on the tape-like release film being fed;
   wherein the tape-like release film includes a stretch film having resistance to heat equal to or higher than a curing temperature of the prepreg being used and generates thermal contraction stress.

2. The apparatus for continuously forming an fiber reinforced plastic square pipe according to claim 1, wherein the device for wrapping on the tape-like release film in the circumferential direction and the device for hot-pressing, pulling and holding the prepreg are controlled in a mutually interlocked fashion.

* * * * *